Figure 1:
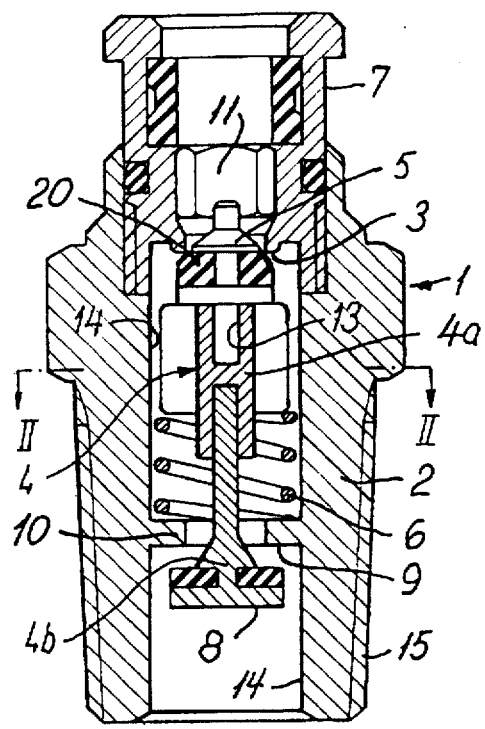

United States Patent [19]

Kryger

[11] Patent Number: 5,787,921
[45] Date of Patent: Aug. 4, 1998

[54] GAS CONTAINER VALVE

[75] Inventor: Villy Ebert Kryger, Helsingør, Denmark

[73] Assignee: Kosan Teknova A/S, Nivaa, Denmark

[21] Appl. No.: 600,955

[22] PCT Filed: Sep. 1, 1994

[86] PCT No.: PCT/DK94/00327

§ 371 Date: Feb. 22, 1996

§ 102(e) Date: Feb. 22, 1996

[87] PCT Pub. No.: WO95/07424

PCT Pub. Date: Mar. 16, 1995

[30] Foreign Application Priority Data

Sep. 9, 1993 [DK] Denmark ............................ 1011/93

[51] Int. Cl.$^6$ .......................... F16K 43/00; F16K 15/18
[52] U.S. Cl. ...................... 137/329.2; 137/614.19; 137/614.2
[58] Field of Search ................. 137/329.1, 329.2, 137/329.3, 329.4, 614.19, 614.2; 251/149.4, 149.6

[56] References Cited

U.S. PATENT DOCUMENTS

| | | | |
|---|---|---|---|
| 624,855 | 5/1899 | Parkes et al. | 137/329.2 |
| 956,082 | 4/1910 | Hannigan | 137/329.4 |
| 1,082,988 | 12/1913 | Wolff | 137/329.2 |
| 1,226,175 | 5/1917 | Bibleheiser, Jr. | 137/329.1 |
| 1,268,160 | 6/1918 | Sammons | 137/329.1 |
| 1,645,156 | 10/1927 | Rowe | 137/329.1 |
| 1,787,445 | 1/1931 | Gade | 137/329.4 |
| 2,218,318 | 10/1940 | Pfauser | 251/149.4 |
| 2,310,485 | 2/1943 | Wyckhoff | 137/329.4 |
| 2,361,865 | 10/1944 | Norway | 137/614.2 |
| 2,382,235 | 8/1945 | Lamar | 137/329.4 |
| 2,463,493 | 3/1949 | Norway | 137/614.19 |
| 2,632,462 | 3/1953 | Selwyn | 137/614.19 |
| 2,775,256 | 12/1956 | Hanson | 137/329.1 |
| 3,931,829 | 1/1976 | McWhinnie, Jr. et al. | 137/329.1 |
| 4,120,314 | 10/1978 | Lissau | 137/329.4 |
| 4,562,856 | 1/1986 | Garvey et al. | 137/329.3 |

FOREIGN PATENT DOCUMENTS

| | | | |
|---|---|---|---|
| 112696 | 5/1969 | Denmark . | |
| 0018121 | 10/1980 | European Pat. Off. . | |
| 0098914 | 1/1984 | European Pat. Off. . | |
| 506807 | 8/1920 | France | 137/329.4 |
| 1178656 | 9/1964 | Germany | 137/329.3 |
| 3507263 | 1/1987 | Germany . | |
| 20776 | of 1897 | United Kingdom | 137/329.4 |

Primary Examiner—George L. Walton
Attorney, Agent, or Firm—Lane, Aitken & McCann

[57] ABSTRACT

The gas container valve has a valve body (4) with a detachably mounted valve head (5) which by means of a valve spring (6) is pressed against a seat (3) of a bushing (7) screwed into the housing (2) of the gas container valve. The valve body has at its other end a second valve head (8) which when the bushing (7) is unscrewed is pressed against a second valve seat (9) of the valve housing 2 by the valve spring. Thereby, it becomes possible to replace/repair the first valve seat (3) and/or the first valve head (5), while the gas container valve is mounted on a gas container containing gas under pressure.

20 Claims, 2 Drawing Sheets

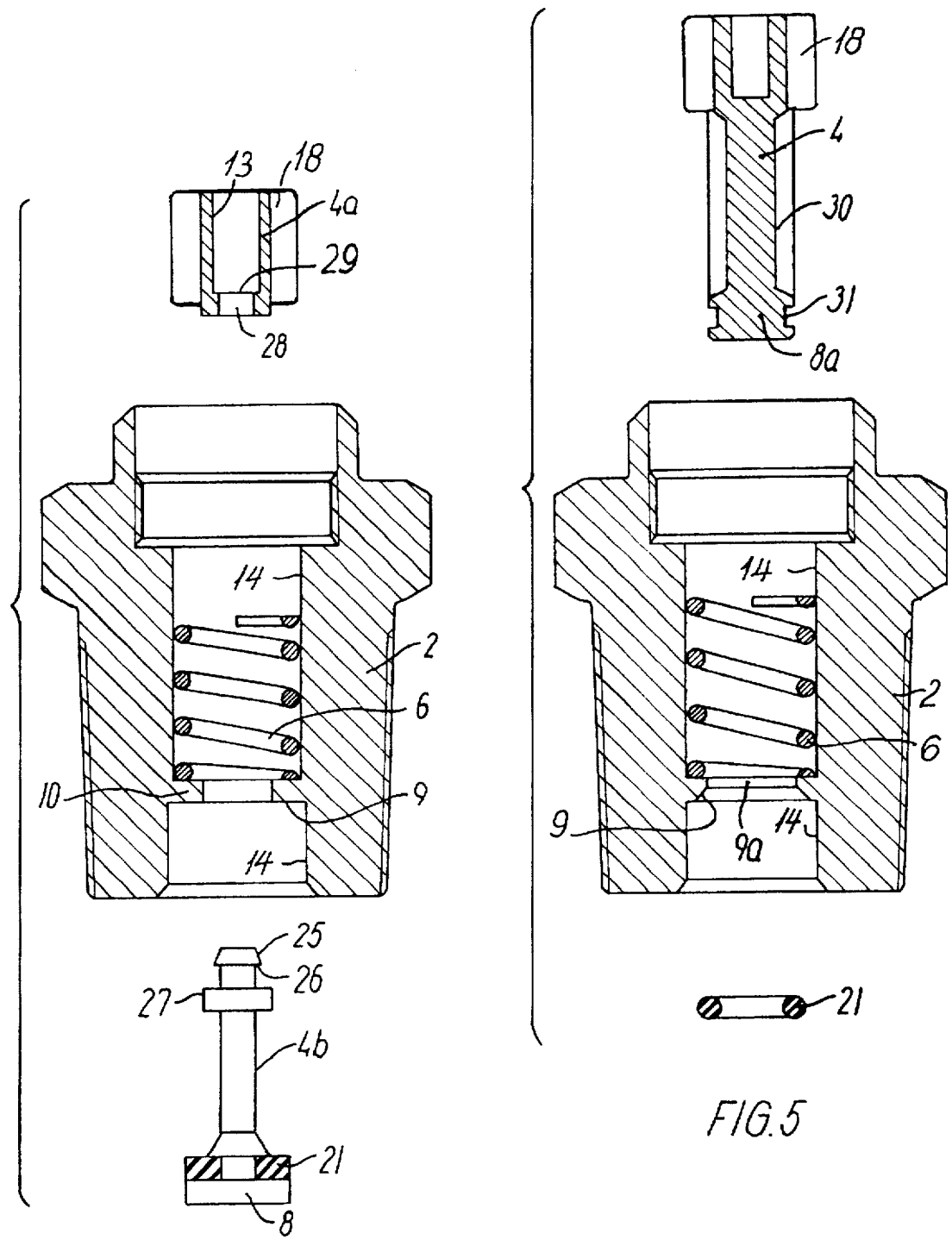

GAS CONTAINER VALVE

The invention relates to a gas container valve for a container for liquified gas comprising a valve housing with a detachably mounted bushing with a valve seat, an elongate valve body which is displaceable in a bore in the valve housing, said valve body comprising a valve head, a valve spring biassing the valve body against the valve seat in the outflow direction of the gas, and a second valve seat and valve head placed upstream of the valve seat and the valve head.

A gas container valve of this type is known from EP-A1-0 018 121 corresponding to DK Patent Application No. 1516/79. In this known gas container valve the valve seat and the valve head may be removed for replacement or repair purposes without any need for emptying the container of gas, as the container may be closed by means of a second valve positioned up-stream of the first valve, said second valve being in this case manually operated. This gas container valve suffers from the substantial drawback that it is expensive to manufacture and is liable to damage during handling of the container for liquified gas. Furthermore, it has the drawback that the detachably mounted bushing, in which the valve seat is located, also contains the valve body with valve spring and abutment therefor, which for a replacement of the valve head entails dismantling of said parts with a subsequent reassembling, which is labour-consuming.

EP-A2-0 098 914 discloses a double seal valve for filling pressurized tanks. The valve contains two separate valve units each having a valve seat, a valve head and a valve spring. The valve unit adjacent to the tank is arranged to open after the other valve unit opens and to close before the other valve unit closes.

DK Patent No. 112,696 discloses a gas container valve, in which two detachable bushings are placed one after the other, each having a valve aggregate comprising valve seat, valve head, valve spring, and abutment for the valve spring. This gas container valve is expensive to manufacture and requires like the aforementioned gas container valve much labour in connection with dismantling and replacement of damaged valve parts.

U.S. Pat. No. 4,120,314 discloses a hydraulic activation valve, in which valve seat, valve head, valve spindle and valve spring are contained in a unit, which may be screwed into the valve aggregate. The individual parts are, however, assembled in the bushing in such a way that they cannot be replaced, and it is necessary to discard all parts if the valve becomes leaky.

It is the object of the invention to provide a gas container valve which allows the repair of a leaky gas container valve, without the gas container having to be emptied first of gas, and in which the valve does not suffer from the above-mentioned drawbacks.

This object is met according to the invention by a valve of the type stated by way of introduction, said valve being characteristic in that the first valve head is detachably mounted on the valve body, that the second valve head is mounted on the valve body, that the valve spring is positioned between the first and the second valve heads, one end engaging an abutment in the bore of the valve housing and the other end engaging the valve body that the valve unit formed by the second valve seat and the second valve head is open when the bushing is mounted in the valve housing, and in that the valve spring brings the second valve head to sealing contact with the second valve seat, when the bushing has been dismantled.

Dismantling of the bushing results in the valve body being free to displace itself in the outflow direction of the gas under bias of the valve spring, until the second valve head at the end of the valve body facing the gas container abuts against its valve seat and consequently impedes gas in the container from flowing out. It is then possible to replace the first valve head and/or the bushing and to assemble the gas container valve again without having to empty the container of gas first. The first valve head is detachably mounted on the valve body and by dismantling the detachable bushing quick access for repair or exchange of the valve seat in the bushing and the valve head is attained. The valve body with valve spring, however, remains in the housing of the gas container valve, and the valve spring pulls the second valve head into abutment against the second valve seat, the gas in the container being thus prevented from streaming out. Thus, only the parts to be replaced are removed, and the task of dismantling is reduced to a minimum.

In a preferred embodiment the valve body comprises an upper part carrying the first valve head and being provided with means for guiding the valve body in the bore, and a lower part carrying the second valve head. This makes it possible to mount each of the two parts of the valve body from their respective ends of the valve housing and to assemble them for instance by screwing together or by soldering.

In a particularly preferred embodiment of the invention the upper and lower parts of the valve body are connected by means of a snap lock, which makes the assembly particularly simple, the two parts just having to snap into each other, whereby more complicated operations, like for instance the above-mentioned screwing together or welding, are avoided.

Another embodiment of the invention is characteristic in that the valve body is a unit and that the biggest cross-section of the second valve head is smaller than the opening defined by the second valve seat and carries a resilient sealing, the outer periphery of which, seen in a plane parallel to the second valve seat, is bigger, when in use, than the outer periphery of said opening. Hereby, a particularly simple manufacture of the valve body is attained, and if the sealing for instance consists of a resilient ring which is to be placed in a groove in the second valve head, the assembly work is reduced to running the valve body through the valve housing from one end and then to snapping the O-ring into the groove from the other end of valve housing. The assembly work may be further simplified in that the dimension of the groove and the resiliency of the sealing are chosen such that the force needed for pressing the valve body with mounted sealing through the opening defined by the valve body is substantially bigger than the force exerted by the gas in a gas container on the other valve head against its seat, when the bushing has been removed, whereby it is ensured that the valve head cannot be pressed out again by the gas. By such a solution the assembly is reduced to just inserting the valve body from one end of the valve housing and pressing it through the opening of the second valve seat.

In a third embodiment the valve body may have means for guiding the valve body in the opening defined by the second valve seat. This has the effect that the valve is guided more securely during its movement, the guiding means contributing simultaneously to impart a bigger rigidity to the valve body, which contributes to safeguarding the valve body against damage during the handling before or during the assembly.

In a preferred embodiment of the gas container valve according to the invention the abutment for the first end of the valve spring is an annular shoulder in the bore of the valve housing and carries the second valve seat. This combination of valve seat and abutment for the valve spring simplifies the manufacture of the gas container valve and makes it less expensive.

Figure 2:
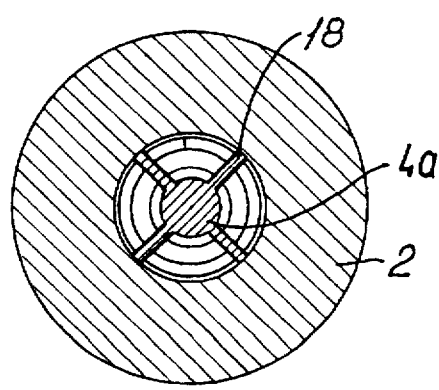
Figure 3:
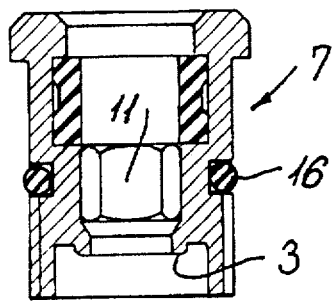
Figure 3:
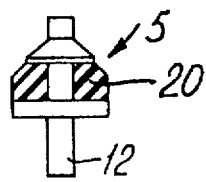
Figure 3:
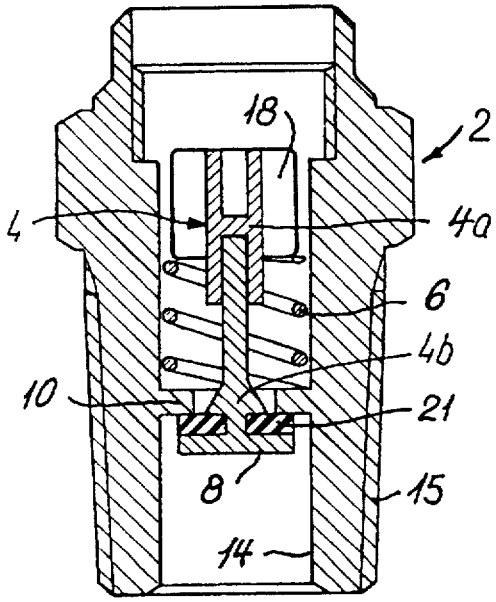

The invention will now be explained in detail in the following by means of an embodiment and with reference to the drawing, in which FIG. 1 is a longitudinal sectional view of a gas container valve according to the invention, the first valve head being in close abutment against its seat, FIG. 2 a cross-sectional view along line II—II in FIG. 1, FIG. 3 is a longitudinal sectional view of the valve housing in FIG. 1, the bushing and the first valve head being shown in a dismantled state, and the second valve head in close abutment against its seat, FIG. 4 is a longitudinal sectional view of a valve housing and a valve body in two parts for assembly by a snap lock, and FIG. 5 is a sectional view of a valve housing and an integral valve body and associated sealing.

The gas container valve 1 shown in the drawing has a housing 2 with a central bore 14 and an outer, conical thread 15 for the screwing down of the gas valve in the outlet of a gas container. In the other end of the container a bushing has been screwed on, said bushing carrying a valve seat 3. The bushing has an O-ring 16 for sealing the joint against the valve housing 1. Internally, the bushing is provided with a hexagonal hole 11 allowing an Allen key to be used for the dismantling of the bushing.

In the bore 14 of the valve housing 2 a valve body 4 is provided, said valve body carrying four wings 18 which guide the valve body during its movement in the bore. A valve spring 6 has been inserted between the valve guides 18 and an annular projection 10 in the bore 14, said valve spring acting on the valve body in the direction towards the valve seat 3. A valve head 5 carried by the valve body 4 is, as will be best seen from FIG. 2, provided with a pin 12 which fits loosely in a central bore 13 in the valve body, and a sealing 20 providing a tight sealing against the valve seat 3. The valve body 4 comprises in this case an upper part 4a and a lower part 4b assembled by means of soldering.

The annular projection 10 in the bore 14 of the valve housing forms a valve seat 9 for a second valve head 8 which is integral with the end of the valve body 4. The valve head 8 carries a sealing 21 for providing a tight sealing against the valve seat 9.

As can be seen from FIGS. 1 and 2, the distance between the O-ring 16 and the top of the valve housing 2, when the bushing 7 is in the mounted position, is larger than the distance between the sealing side of seal 21 and the second valve seat 9. As a result, as the bushing 7 is removed by unscrewing, the sealing 21 of the second sealing valve head 8 seals against the second valve seat 9 before O-ring 16 is moved out of sealing engagement with the wall of the bore in the top of the valve housing 2. Also, the sealng between the seal 20 of the first sealing valve head 5 and the first valve seat 3 will be maintained due to the action of the spring 6 until the sealing 21 of the second sealing valve head 8 seals against the second valve seat 9. Conversely, when the detachably mounted bushing 7 is mounted, the gas passage between the bushing and the bore in the valve housing 2 is sealed by the O-ring 16, and the gas passage through the first valve seat 3 is sealed by the first sealing valve head 3 before the second sealing valve head 8 is opened.

The valve body shown in FIG. 4 consists of two parts 4a,4b carrying the female and the male part of a snap lock connection. The snap lock connection of the lower part 4b comprises a collar 27 and a truncated cone 25, the large end base of which forms a shoulder 26. The snap lock connection of the upper part 4a is established by a narrowing 28 of the bore 13, where the transition between the narrowing and the bore forms an internal shoulder 29. The valve body is assembled by introducing the truncated cone 25 of part 4b into the narrowing 28 until collar 27 abuts against the under side of part 4a and the rim of the base 26 abuts against the shoulder 29.

The valve body 4 shown in FIG. 5 is integral and has a head 8a which extends through the opening 9a of the valve housing 2. The valve body 4 has a set of wings 18 for guidance in the bore 14 of the valve housing and another set of wings 30 for guidance in the opening 9a. The valve head 8a has a groove 31 for receiving a sealing 21, here shown as an O-ring.

When repairing a leaky gas container valve 2 the bushing 7 is screwed out first from the valve housing 2, following which the valve head 5 is taken out. Simultaneously therewith the valve spring 6 biasses valve head 8 towards its seat 9 and thereby prevents the gas in the container from flowing out. Depending on the kind of leak, a new valve head 5 and/or a new bushing is then mounted.

During the first part of the screwing down of the bushing 7 the second valve head 8 closes for the gas stream, until the valve seat 3 of the bushing abuts the first valve head 5, which then takes over the closing. At the same time valve 8,9 is opened at the bottom end of valve body 4 as the bushing 7 is screwed all the way down.

I claim:

1. A gas container valve (1) for a container for liquified gas comprising a valve housing (2) with a detachably mounted bushing (7) with a first valve seat (3), an elongate valve body (4) which is displaceable in a bore (14) in the valve housing, said valve body comprising a first sealing valve head (5), a valve spring (6) biasing the first sealing valve head into flow obturating engagement against the first valve seat in the outflow direction of the gas, and a second valve seat (9) and a second sealing valve head (8) placed upstream of the first valve seat (3) and the first sealing valve head (5), characterized in that the first sealing valve head (5) is detachably mounted on the valve body (4), that the second sealing valve head (8) is mounted on the valve body (4), that the valve spring (6) is positioned between the first (5) and the second (8) sealing valve heads, one end of the valve spring engaging an abutment (10) in the bore (14) of the valve housing (1) and the other end of the valve spring engaging the valve body (4), that the valve unit formed by the second valve seat (9) and the second sealing valve head (8) is open when the bushing (7) is mounted in the valve housing (2), and in that the valve spring (6) brings the second sealing valve head (8) to flow obturating sealing contact with the second valve seat (9) when the bushing (7) has been dismantled.

2. A gas container valve according to claim 1, characterized in that the valve body (4) comprises an upper part (4a) carrying the first sealing valve head (5) and being provided with means (18) for guiding the valve body (4) in the bore (14) and a lower part (4b) carrying the second sealing valve head (8).

3. A gas container valve according to claim 2, characterized in that the upper and lower parts (4a and 4b) of the valve body (4) are connected by means of a snap lock.

4. A gas container valve according to claim 1, characterized in that the valve body (4) is a unit and that the biggest cross-section of the second sealing valve head (8a) is smaller than the opening (9a) defined by the second valve seat (9) and carries a resilient sealing (21), the outer periphery of which, seen in a plane parallel to the second valve seat (9), is bigger when in use than the outer periphery of said opening (9a).

5. A gas container valve according to claim 1 characterized in that the valve body (4) has means (30) for guiding the valve body (4) in the opening (9a) defined by the second valve seat (9).

6. A gas container valve according to claim 1 characterized in that the abutment (10) for the first end of the valve spring (6) is an annular projection (10) in the bore (14) of the valve housing (2) and carries the second valve seat (9).

7. A gas container valve according to claim 2, characterized in that the valve body (4) has means (30) for guiding the valve body (4) in the opening (9a) defined by the second valve seat (9).

8. A gas container valve according to claim 3, characterized in that the valve body (4) has means (30) for guiding the valve body (4) in the opening (9a) defined by the second valve seat (9).

9. A gas container valve according to claim 4, characterized in that the valve body (4) has means (30) for guiding the valve body (4) in the opening (9a) defined by the second valve seat (9).

10. A gas container valve according to claim 2, characterized in that the abutment (10) for the first end of the valve spring (6) is an annular projection (10) in the bore (14) of the valve housing (2) and carries the second valve seat (9).

11. A gas container valve according to claim 3, characterized in that the abutment (10) for the first end of the valve spring (6) is an annular projection (10) in the bore (14) of the valve housing (2) and carries the second valve seat (9).

12. A gas container valve according to claim 4, characterized in that the abutment (10) for the first end of the valve spring (6) is an annular projection (10) in the bore (14) of the valve housing (2) and carries the second valve seat (9).

13. A gas container valve according to claim 5, characterized in that the abutment (10) for the first end of the valve spring (6) is an annular projection (10) in the bore (14) of the valve housing (2) and carries the second valve seat (9).

14. A gas container valve according to claim 7, characterized in that the abutment (10) for the first end of the valve spring (6) is an annular projection (10) in the bore (14) of the valve housing (2) and carries the second valve seat (9).

15. A gas container valve according to claim 8, characterized in that the abutment (10) for the first end of the valve spring (6) is an annular projection (10) in the bore (14) of the valve housing (2) and carries the second valve seat (9).

16. A gas container valve according to claim 9, characterized in that the abutment (10) for the first end of the valve spring (6) is an annular projection (10) in the bore (14) of the valve housing (2) and carries the second valve seat (9).

17. A gas container valve according to claim 1, characterized in that the valve spring (6) is the sole spring of the valve.

18. A gas container valve (1) for a container for liquified gas comprising a valve housing (2) with a detachably mounted bushing (7) with a first valve seat (3), a valve body (4) which is displaceable in a bore (14) in the valve housing, said valve body comprising a first sealing valve head (5), a valve spring (6) biasing the first sealing valve head into flow obturating engagement against the first valve seat in the outflow direction of the gas, and a second valve seat (9) and a second sealing valve head (8) placed upstream of the first valve seat (3) and the first sealing valve head (5), characterized in that the first sealing valve head (5) is detachably mounted on the valve body (4), that the second sealing valve head (8) is mounted on the valve body (4), that the valve unit formed by the second valve seat (9) and the second sealing valve head (8) is open when the bushing (7) is mounted in the valve housing (2), and in that the valve spring (6) brings the second sealing valve head (8) to flow obturating sealing contact with the second valve seat (8) when the bushing (7) has been dismantled, wherein the valve further comprises means (16) for providing a seal between the detachably mounted bushing and the valve housing (2) before the second sealing valve head (8) is opened.

19. A gas container valve according to claim 18, wherein said means for providing a seal comprises a seal (16) mounted on the detachably mounted bushing (7).

20. A gas container valve according to claim 19, wherein the bore has an outer end and receives the detachably mounted bushing (7), the bore has a wall sealingly engaged by the seal (16), and said outer end of the bore is larger than the distance between the sealing side of the seal (21) on the second sealing valve head (8) and the second valve seat (9), when the detachable bushing (7) is mounted in said bore.

* * * * *

UNITED STATES PATENT AND TRADEMARK OFFICE
CERTIFICATE OF CORRECTION

PATENT NO. : 5,787,921
DATED : August 4, 1998
INVENTOR(S) : Villy Ebert Kryger

It is certified that error appears in the above-indentified patent and that said Letters Patent is hereby corrected as shown below:

Column 1, line 62, after "body" insert a comma.

Column 6, line 41, after the comma insert "and the distance between the seal (16)".

Signed and Sealed this

Third Day of November, 1998

Attest:

BRUCE LEHMAN

Attesting Officer        Commissioner of Patents and Trademarks